United States Patent
Smith et al.

(10) Patent No.: US 12,265,267 B2
(45) Date of Patent: Apr. 1, 2025

(54) ANGLE POLISHING SYSTEMS AND METHODS FOR MULTI-FERRULE OPTICAL CONNECTORS

(71) Applicant: Ortronics, Inc., New London, CT (US)

(72) Inventors: Daniel M. Smith, Westerly, RI (US); Ryan J. Grandidge, Wakefield, RI (US); Thomas Knychalski, Wakefield, RI (US); Robert E. Abel, East Lyme, CT (US)

(73) Assignee: Legrand DPC, LLC, West Hartford, CT (US)

( * ) Notice: Subject to any disclaimer, the term of this patent is extended or adjusted under 35 U.S.C. 154(b) by 85 days.

(21) Appl. No.: 17/887,193

(22) Filed: Aug. 12, 2022

(65) Prior Publication Data

US 2022/0390687 A1     Dec. 8, 2022

Related U.S. Application Data

(62) Division of application No. 16/684,899, filed on Nov. 15, 2019, now Pat. No. 11,448,833.

(51) Int. Cl.
    *G02B 6/38*     (2006.01)
    *B24B 9/06*     (2006.01)

(52) U.S. Cl.
    CPC .............. *G02B 6/3871* (2013.01); *B24B 9/06* (2013.01); *G02B 6/3863* (2013.01); *G02B 6/387* (2013.01)

(58) Field of Classification Search
    CPC .... G02B 6/3871; G02B 6/3863; G02B 6/387; G02B 6/3869; B24B 9/06
    See application file for complete search history.

(56) References Cited

U.S. PATENT DOCUMENTS

| | | | |
|---|---|---|---|
| 11,448,833 | B2 | 9/2022 | Smith |
| 2006/0269194 | A1 | 11/2006 | Luther et al. |
| 2008/0159697 | A1 | 7/2008 | Lu |
| 2018/0088288 | A1 | 3/2018 | Taira et al. |

FOREIGN PATENT DOCUMENTS

JP     S5528058 A     2/1980

OTHER PUBLICATIONS

European Search Report dated Apr. 9, 2021 for European Patent Application 20206467.2.
U.S. Appl. No. 16/684,899, filed Nov. 15, 2019, U.S. Pat. No. 11,448,833 issued Sep. 20, 2022.

*Primary Examiner* — Marin Pichler
*Assistant Examiner* — Mary A El-Shammaa
(74) *Attorney, Agent, or Firm* — McCarter & English, LLP

(57) ABSTRACT

Systems and methods for angle polishing of the end faces of a plurality of optical connectors are provided. Systems are provided that include a connector defining a longitudinal axis, and at least two ferrules mounted with respect to the connector and arranged in a side-by-side orientation. The end faces of the connectors are movable relative to the connector and such movement facilitates lateral orientation of the angle polished end faces of the ferrules relative to the connector when in the mating position. Various mechanisms and methods for facilitating movement of the ferrules relative to the connector are disclosed to achieve the desired lateral polish orientation of the ferrule end faces.

20 Claims, 13 Drawing Sheets

ANGLE POLISHING SYSTEMS AND METHODS FOR MULTI-FERRULE OPTICAL CONNECTORS

CROSS-REFERENCE TO RELATED APPLICATIONS

This is a divisional patent application which claims the benefit of U.S. Non-Provisional patent application Ser. No. 16/684,899, which was filed on Nov. 15, 2019. The entire content of the foregoing patent application is incorporated herein by reference.

BACKGROUND

1. Technical Field

The present disclosure is directed to systems and methods for angle polishing of the end faces of a plurality of optical connectors. In exemplary embodiments, the disclosed systems/methods position at least two ferrule end faces in a substantially coplanar configuration and angle polish the end faces in such coplanar configuration.

2. Background Art

A simplex fiber cable consists of a single strand of glass or plastic fiber. Simplex fiber is most often used where only a single transmit and/or receive line is required between devices or when a multiplex data signal is used (bi-directional communication over a single fiber). Simplex fiber connectors have traditionally been angle polished with a lateral orientation. That is, the angle of the ferrule end face slopes from right to left, or vice versa, across a vertical plane bisecting the principal keying feature of the connector. Because of the construction style of standard adapters, the noted angling conventions enable angle polished connectors (APCs) to be executed with only one type of angled connector. This convention is used in connectors such as LC, SC, MU, ST and FC connector types.

Vertical orientation conventions, such as are utilized with multi-fiber MPO connector types, have the disadvantage of requiring either (a) an inversion of the mating connector, or (b) employment of two different angled connector types. Both of these options add cost and complexity in determining and constructing proper polarity solutions, which is one reason that vertical orientation conventions for APC polish are not commonly used with simplex fiber connectors.

With the more recent advent of purpose-built twin-fiber connectors such as the SEN type, which have a tandem (side-by-side) ferrule arrangement, a significant challenge exists in implementing lateral angle polishing so as to provide APCs in a reliable and cost effective manner. With simplex connectors, gang polishing is quite simple as each connector is placed into its own fixture position. However, with two or more fibers arranged together in a row, in order to gang-polish the whole row with consistent end-face geometry, it is necessary to have all fiber end faces positioned in a substantially coplanar orientation during the polishing process.

In the SEN connector arrangement, which uses a tandem ferrule arrangement, simply inserting the standard connector at the requisite angle (typically 8°) is insufficient, as the ferrule end faces will not be coplanar. One ferrule will stand roughly 0.5 mm lower than the other. Either the connector itself, or the polishing fixture which is used to polish the connector, must eliminate this non-coplanar condition during polishing, and then restoring it once the termination and assembly processes are complete. With increasing industry standardization to SEN type connectors, the need to find APC solutions becomes clear, e.g., for passive optical LAN systems and other low-reflection applications. Indeed, this requirement is true of any multi-fiber connector with a tandem ferrule arrangement, not just the SEN type.

One solution to this problem would be to polish the ferrules individually prior to assembly into the connector. However, this solution is inefficient in a production environment, as it forces the connector assembly process to be divided between extensive pre-polish and post-polish assembly operations. The optimal solution would allow the assembled connector to be gang-polished with the ferrule end faces substantially coplanar, and then simply be brought into the proper non-coplanar condition for connector mating thereafter, i.e., when arranged in the mating position. The various embodiments of the current invention all operate based upon this design principle.

Systems and methods are disclosed herein to address needs associated with angle polishing of tandem connectors, e.g., SEN type connectors.

SUMMARY

Various systems and methods for angle polishing of the end faces of a plurality of optical connectors are disclosed herein. In particular, systems are provided that include a connector defining a longitudinal axis, and at least two ferrules mounted with respect to the connector and arranged in a side-by-side orientation. The end faces of the connectors are movable relative to the connector and such movement facilitates lateral orientation of the angle polished end faces of the ferrules relative to the connector when in the mating position. Various mechanisms and methods for facilitating movement of the ferrules relative to the connector are disclosed to achieve the desired lateral polish orientation of the ferrule end faces in the mating position.

In an exemplary embodiment of the present disclosure, a system for angle polishing of side-by-side ferrules to deliver polished surfaces in a lateral orientation is provided, wherein the system includes a connector including a connector body and defining a longitudinal axis, at least two ferrules mounted with respect to the connector body and arranged in a side-by-side orientation, wherein each of the at least two ferrules defines an end face. The connector body is configured to allow at least one of the at least two ferrules to move relative to the connector body. Movement of the at least one ferrule relative to the connector body facilitates lateral orientation of the angle polished end faces of all ferrules relative to the connector body when in the mating position.

The disclosed system may be implemented by providing the connector body with a split that separates an upper connector body portion and a lower connector body portion. In such exemplary implementation, the upper connector body portion is movable relative to the lower connector body portion. More particularly, the upper connector body portion and the lower connector body portion may be movable between (i) a first position wherein the split defines a gap between the upper connector body portion and the lower connector body portion, and (ii) a second position wherein the upper connector body portion is in abutting relation with the lower connector body portion.

The at least two ferrules may define a first ferrule and a second ferrule, wherein each of the first and second ferrules define an end face. In the first position referenced above, the end face of the first ferrule and the end face of the second ferrule are coplanar in a plane that is angled relative to the longitudinal axis of the connector. More particularly, the end faces of the first and second ferrules may be coplanar in a plane that is angled at an angle of 8° relative to the longitudinal axis of the connector.

In the second position referenced above, the end face of the first ferrule and the end face of the second ferrule are in a mating position with the polished end faces in a lateral orientation. Of note, the first and second end faces are generally polished in the first position, and then moved to the second position.

In an alternative implementation of the disclosed system, the connector body may include compression springs that apply a distal bias on the at least two ferrules, and the connector body defines slot(s), e.g., a slot for each of the ferrules associated with the connector. A shim is provided that is configured to be removably received by the slot(s) defined by the connector body. A compression spring is restrained by introduction of the shim into a slot, and the compression spring is unrestrained when the shim is removed.

In the disclosed system, the at least two ferrules may define a first ferrule and a second ferrule, and each of the first and second ferrules define an end face. The first ferrule is movable between (i) a first position in which the end face of the first ferrule and the end face of the second ferrule are coplanar in a plane that is angled relative to the longitudinal axis of the connector, and (ii) a second position, i.e., the mating position, in which the end faces of the first ferrule and the end face of the second ferrule are angle polished and in a lateral orientation. The first and second ferrules are in the first position when the compression spring is restrained by the shim, and the first and second ferrules are in the second/mating position when the compression spring is unrestrained by the shim.

In a further exemplary implementation according to the present disclosure, the at least two ferrules may define a first ferrule and a second ferrule, and each of the ferrules includes a fitting that defines a guide hole. The connector body defines first and second slots that align with the guide holes of the first and second ferrules. A slide cam is provided that defines a pin-like extension that is configured and dimensioned to (i) extend through one of the first and second slots, and (ii) engage a guide hole associated with one of the first and second ferrules.

Each of the first and second ferrules define an end face, and movement of the slide cam relative to the connector body when in engagement with the guide hole of a ferrule, e.g., the first ferrule, moves the first ferrule between (i) a first position in which the end face of the first ferrule and the end face of the second ferrule are coplanar in a plane that is angled relative to the longitudinal axis of the connector, and (ii) a second position, i.e., the mating position, in which the end face of the first ferrule and the end face of the second ferrule are angle polished and in a lateral orientation. In exemplary embodiments, the slide cam is associated with a polishing fixture.

In a further exemplary implementation according to the present disclosure, a sleeving element is provided that defines an internal offset feature and is configured/dimensioned to engage the connector body. The at least two ferrules may define a first ferrule and a second ferrule, wherein each of the first and second ferrules define an end face. Movement of the sleeving element relative to the connector body when in engagement with the connector body moves the first ferrule between (i) a first position in which the end face of the first ferrule and the end face of the second ferrule are coplanar in a plane that is angled relative to the longitudinal axis of the connector, and (ii) a second position, i.e., the mating position, in which the end face of the first ferrule and the end face of the second ferrule are angle polished and in a lateral orientation.

In a still further exemplary implementation according to the present disclosure, the at least two ferrules may define a first ferrule and a second ferrule, wherein each of the first and second ferrules define an end face. The first and second ferrules are rotatably mounted within the connector body. A tool may be provided that includes an elongated cylindrical extension defining a hollow central channel and distally extending teeth. The first and second ferrules may include notched fittings that are adapted to engage the distally extending teeth of the tool. When the tool is engaged with the notched fitting of one of the ferrules, that ferrule may be manually rotated relative to the connector body. In exemplary embodiments, the tool is effective to manually rotate the ferrule(s) by 90° relative to the connector body. In this way, after angle polishing of the end faces of the ferrules, the ferrules may be rotated such that, in the mating position, the angle polished end faces are in a lateral orientation.

In a further exemplary embodiment, the connector body includes (i) an initial channel, (ii) a transfer channel, and (iii) a main channel. The two ferrules may define a first ferrule and a second ferrule, and each of the ferrules define an end face and a cam extension. Proximal movement of a ferrule relative to the connector body causes the ferrule to rotate relative to the connector body based on camming engagement between the cam extension associated with the ferrule and the transfer channel. Through the noted camming engagement, the ferrule generally rotates by 90° relative to the connector body. In this way, after angle polishing of the end faces of the ferrules, the ferrules may be rotated such that, in the mating position, the angle polished end faces are in a lateral orientation.

The present disclosure also provides advantageous methods for providing a connector that includes at least two side-by-side ferrules that include polished end faces characterized by a lateral polish orientation. In a first exemplary implementation, the end faces of the two side-by side ferrules are polished when the ferrules are in a first position in which the end face of the first ferrule and the end face of the second ferrule are coplanar in a plane that is angled relative to the longitudinal axis of the connector, and, after polishing, the ferrules are moved to a second position, i.e., the mating position, in which the end face of the first ferrule and the end face of the second ferrule are angle polished and in a lateral orientation.

In a further advantageous method for providing a connector that includes at least two side-by-side ferrules that include polished end faces characterized by a lateral polish orientation, the end faces of the two side-by-side ferrules are polished when the ferrules are in a first position in which the end face of the first ferrule and the end face of the second ferrule are coplanar in a plane that is perpendicular to the longitudinal axis of the connector, and, after polishing, the ferrules are rotated relative to the connector by 90°. In this way, after angle polishing of the end faces of the ferrules, the ferrules may be rotated such that, in the mating position, the angle polished end faces are in a lateral orientation.

Additional features, functions and benefits of the disclosed systems and methods will be apparent from the detailed description which follows, particularly when read in conjunction with the appended figures.

BRIEF DESCRIPTION OF FIGURES

To assist those of skill in the art in making and using the systems and methods of the present disclosure, reference is made to the accompanying figures, wherein.

DESCRIPTION OF EXEMPLARY EMBODIMENTS

The present disclosure provides advantageous systems and methods for APC polishing multi-ferrule optical connectors with tandem, or side-by-side, ferrule arrangements. Although the disclosed systems and methods are described herein with reference to exemplary embodiments/implementations thereof, it is to be understood that the present disclosure is not limited by or to such exemplary embodiments/implementations. Rather, the disclosed systems and methods are subject to revisions, modifications and/or enhancements without departing from the spirit or scope of the present disclosure. For example, the examples provided herein are modeled upon an SEN connector type, but it is to be understood that the systems/methods disclosed herein would apply equally well to any multi-ferrule connector type where the ferrules are arranged in a tandem row.

According to the disclosed systems and methods, side-by-side, i.e., tandem, ferrule end-faces are positioned in a substantially coplanar orientation for polishing operations. In order to position the ferrule end faces substantially co-planar for APC polishing, the systems and methods of the present disclosure either (a) adjust the vertical offset of the ferrules for polishing operations such that, when returned to the mating position, the polished end faces are in a lateral orientation, or (b) all ferrules in the tandem row are angle-polished and then rotated 90° post-polishing to place the angle polished end faces in a lateral orientation when in the mating position.

Figure 3:
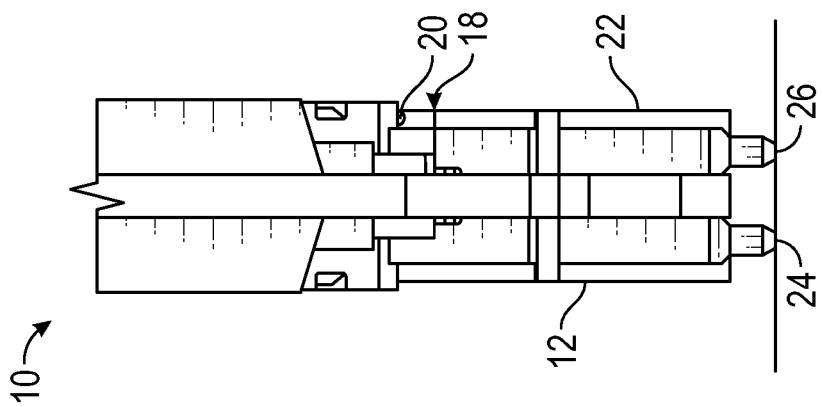
FIG. 3 is a side view of the exemplary connector of FIGS. 1 and 2, where the ferrule that had extended distally relative to the adjacent ferrule has moved proximally so as to be in a mating position with the polished end faces in a lateral orientation.
Figure 2:
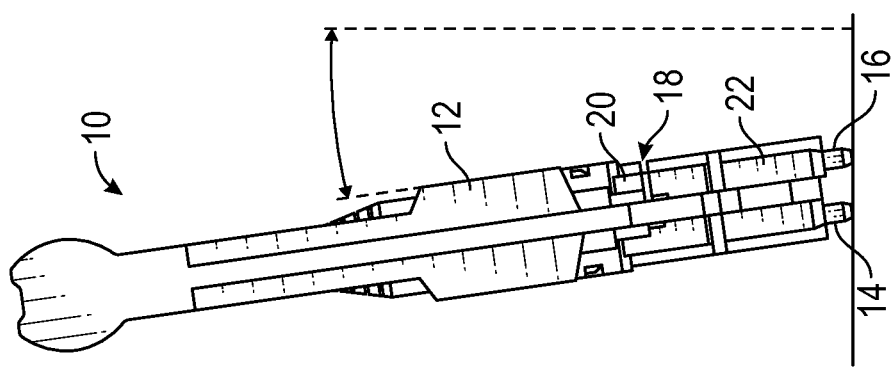
FIG. 2 is a side view of the exemplary connector of FIG. 1, with the connector laterally angled relative to the longitudinal axis of the connector and the ferrules in a coplanar orientation that is aligned with a polishing surface.
Figure 1:
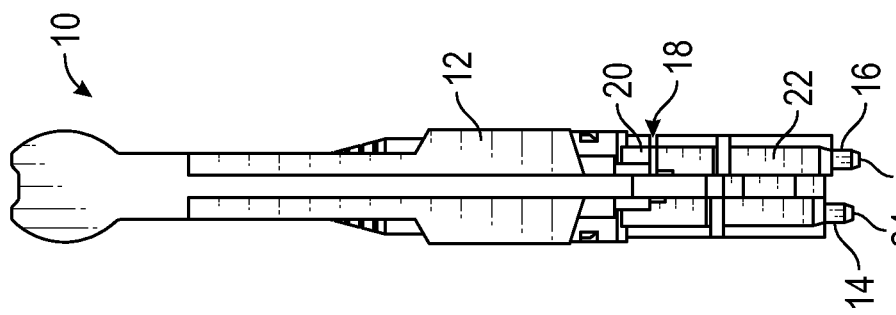
FIG. 1 is a side view of an exemplary connector according to the present disclosure, with one ferrule extending distally beyond an adjacent second ferrule.

In a first exemplary system/method according to the present disclosure, and as schematically depicted in FIGS. 1-3, connector 10 includes a connector body 12 that supports side-by-side ferrules 14, 16 that are exposed at a distal end thereof. Although connector 10 is shown with two side-by-side ferrules 14, 16, the present disclosure may be extended to implementations wherein a greater number of ferrules are positioned in the noted side-by-side arrangement, and suitable adjustments are made to accommodate the additional ferrule(s) based on the disclosure which follows.

As shown in FIGS. 1 and 2, the connector body 12 defines a transverse split or space 18 that impacts on the distal positioning of ferrule 16 relative to ferrule 14. Thus, above the split 18 is upper connector body portion 20 and below split 18 is lower connector body portion 22. Lower connector body portion 22 is movable relative to upper connector body portion 20 along the longitudinal axis of connector body 10. As shown in FIGS. 1 and 2, with the lower connector body portion 22 spaced away from upper connector body portion 20 based on split/space 18, ferrule 16 is distally extended relative to ferrule 14 and, as a result, the end face 26 of ferrule 16 is positioned in front of the end face 24 of ferrule 14.

Based on the relative positioning of the end faces 24, 26 enabled by split/space 18, when the connector 10 is tilted laterally from vertical (e.g., 8°), both end faces 24, 26 of ferrules 14, 16 may make simultaneous contact with a planar, horizontal polishing surface. As will be apparent to persons skilled in the art, the dimension of the split/space 18 to cause coplanar orientation of end faces 24, 26 is readily determined based on the geometry of connector 10 as disclosed herein. Specifically, the magnitude of the split/space 18 is substantially equal to the distance between the two ferrule axes multiplied by the tangent of the angle of polish (in this case, 8°). If additional tandem ferrules form part of connector 10, then the split/space for each laterally positioned ferrule is calculated in like manner so as to position the end face(s) of each additional ferrule in a coplanar orientation relative to end faces 24, 26 when the connector 10 is laterally tilted, e.g., at 8°. The split/space 18 in the connector body 12 advantageously functions to correct the vertical offset which would otherwise be present in a normal, unmodified connector of the same type when laterally tilted, e.g., at an angle of 8° relative to the longitudinal axis of connector 10.

As schematically depicted in FIG. 3, once the end faces 24, 26 of ferrules 14, 16 have been polished in the laterally tilted orientation shown in FIG. 2, the upper connector body portion 20 and lower connector body portion 22 can be moved relative to each other to eliminate the space 18, e.g., by bringing lower connector body portion 22 into abutting relation with upper connector body portion 20. In exemplary embodiments, the noted relative movement of upper connector body portion 20 and lower connector body portion 22 may be snapped together to permanently fix the two ferrules 14, 16 at the same height. Relative motion of the connector body portions 20, 22 may be manually effectuated, e.g., by overcoming a detent mechanism and sliding the lower connector body portion 22 relative to the upper connector body portion 20. Alternatively, the lower connector body portion 22 may be biased toward the upper connector body portion 20 by way of an internal spring mechanism (not pictured) that, when released (e.g., by a pull tab or the like), axial force is applied to the lower connector body portion 22 to bring it into juxtaposition with upper connector body portion 20.

In sum, the connector 10 of FIGS. 1-3 features a split/space 18 that allows upper/lower connector body portions 20, 22 to move between first and second positions, the first position being characterized by a first ferrule 16 distally extended relative to the second ferrule 14, and the second position, i.e., the mating position, being characterized by the end faces of the first ferrule 16 and the second ferrule 14 angle polished and in a lateral orientation. In the first position, the end faces 24, 26 of the ferrules are co-planar when the connector is laterally tilted for polishing, e.g., at an angle of 8° (as shown in FIG. 2). After polishing, the connector 10 is moved to the second position, i.e., the mating position (as shown in FIG. 3) by eliminating (or substantially eliminating) the split/space 18 such that the upper/lower connector body portions 20, 22 are in abutting relation.

An advantageous method for polishing a connector 10 according to the embodiment of FIGS. 1-3 entails positioning the connector 10 in the first position and laterally tilting the connector (e.g., to an angle of 8°) to polish the end faces 24, 26, then moving the connector to the mating position with the angle polished end faces 24, 26 in lateral orientation by moving the lower connector body portion 22 into abutment with the upper connector body portion 20.

Figure 4:
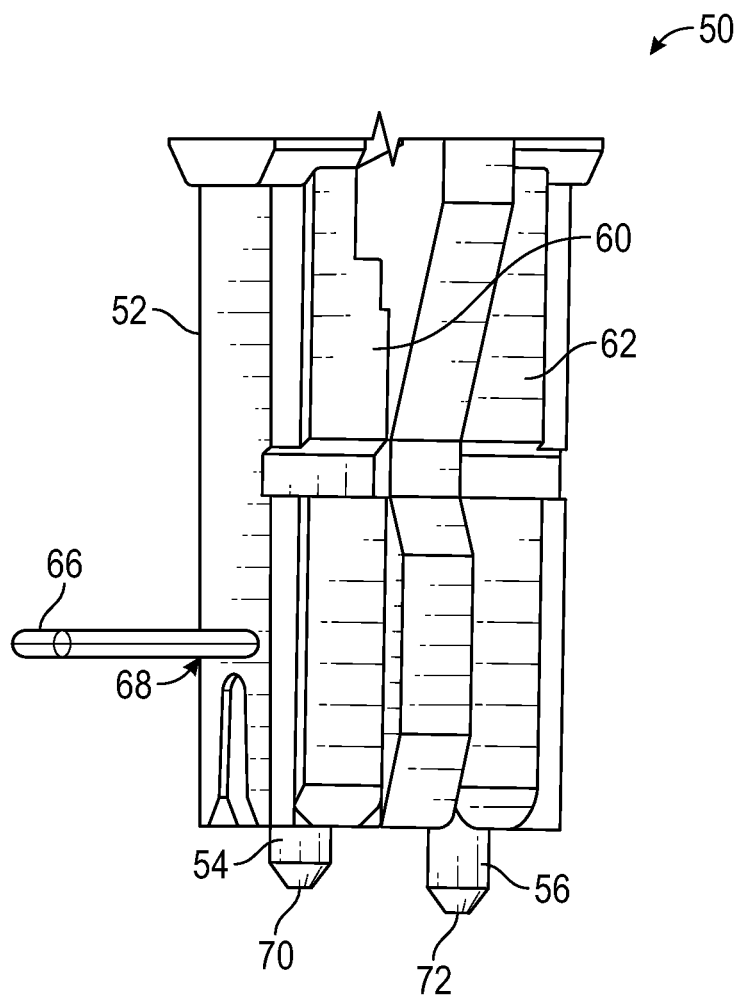
FIG. 4 is side view of an alternative connector with shim mechanism according to the present disclosure.

Turning to FIG. 4, an alternative connector 50 is schematically depicted that includes a connector body 52 that supports side-by-side ferrules 54, 56 that are exposed at a distal end thereof. As with connector 10, connector 50 is shown with two side-by-side ferrules 54, 56. However, the present disclosure may be extended to implementations wherein a greater number of ferrules are positioned in the noted side-by-side arrangement, and suitable adjustments are made to accommodate the additional ferrule(s) based on the disclosure which follows.

First and second compression springs 60, 62 are positioned within connector body 52, with compression spring 60 biasing ferrule 54 distally and compression spring 62 biasing ferrule 56 distally. A shim 66 extends through a slot 68 formed in connector body 52, thereby restraining compression spring 60 from advancing ferrule 54 to its fully extended distal position. Thus, as shown in FIG. 4, the end face 70 of ferrule 54 is set back proximally relative to the end face 72 of ferrule 56. The distance by which end face 70 is proximally positioned relative to end face 72 is established such that end faces 70, 72 are in a coplanar orientation relative to a polishing surface when connector 50 is laterally tilted, e.g., by 8° (as schematically depicted for connector 10 in FIG. 2). Thus, the linear distance by which the compression spring 60 is restrained is calculated so as to achieve the desired coplanar arrangement of end faces 70, 72 for angled polishing operations, e.g., at an angle of 8° relative to the longitudinal axis of connector 50.

After the polishing operation is complete, the shim 66 is removed from slot 68, thereby freeing compression spring 60 to advance ferrule 54 to a distally advanced position (as compared to the position shown in FIG. 4) such that end face 70 is in a mating position with the angled polished end faces in a lateral orientation. In this way, once the end faces 70, 72 of ferrules 54, 56 have been polished in the laterally tilted orientation shown in FIG. 4, removal of shim 66 permits compression spring 60 to advance ferrule 54 to a position such that end faces 70, 72 are in a mating position that is analogous to the lateral orientation of end faces 24, 26 of connector 10 in FIG. 3.

In exemplary embodiments, the noted relative movement of ferrule 54 in response to the force imparted by compression spring 60 after removal of shim 66 may bring ferrule 54 into a fixed/locked position based on a locking mechanism internal to connector body 52, i.e., the two ferrules 54, 56 may be fixed at the same height. Although the embodiment of FIG. 4 is described with reference to compression spring 60 operating to advance ferrule 54 when shim 66 is removed, the reverse operation may be utilized by implementing a spring mechanism that moves ferrule 56 proximally in response to removal of a shim, as will be apparent to persons skilled in the art based on the description provided herein.

In sum, the connector 50 of FIG. 4 features a shim 66 that interacts with an internally positioned compression spring 60. When the shim 66 is removed, the compression spring 60 is unrestrained and it functions to advance ferrule 54/end face 70 to an extended position that aligns with ferrule 56/end face 72 in the mating position of the connector. As such, the design of connector 50 allows ferrule 70 to move between first and second positions, the first position being characterized by end face 70 of first ferrule 54 being proximally positioned relative to the end face 72 of a second ferrule 56, and the second position, i.e., the mating position, being characterized by the end face 70 of first ferrule 54 and the end face 72 of second ferrule 56 being in a lateral orientation. In the first position, the end faces 54, 56 of the ferrules are co-planar when the connector 50 is laterally tilted for polishing, e.g., at an angle of 8° (as shown in FIG. 4). After polishing, the connector 50 is moved to the second/mating position by removing the shim 66 so as to allow compression spring 60 to advance ferrule 54 distally as described herein.

An advantageous method for polishing a connector 50 according to the embodiment of FIG. 4 entails positioning the connector 50 in the first position and laterally tilting the connector (e.g., to an angle of 8°) to polish the end faces 54, 56, then moving the connector to the second/mating position with the end faces 54, 56 in a lateral orientation by removing the shim 66 and allowing the compression spring 60 to exert a distally directed force on ferrule 54.

Of note with reference to the embodiments of FIGS. 1-3 and FIG. 4, in any example where the vertical offset of the ferrules is corrected, the spring load backing one or both ferrules may be affected. In the first example of FIGS. 1-3, where the connector body 12 is split, the spring force backing the right hand ferrule 16 is reduced, while in the second example of FIG. 4, the spring force backing the left hand ferrule 54 is increased due to the fact that this spring is further compressed. This may have a material impact on the overall polishing results, so in order to obtain an even polish between the right and left ferrule positions, some vertical bias, on the order of a few thousandths of an inch, may be desirable, rather than making the ferrules perfectly co-planar. This adjustment may be more easily accomplished in the polishing fixture than in the connector itself, as shown in the following two examples.

In a third example according to the present disclosure, the connector 100 is designed so as to allow a polishing fixture to reorient side-by-side ferrules relative to each other during a polishing operation. As with connectors 10 and 50, connector 100 is shown with two side-by-side ferrules 114, 116. However, the present disclosure may be extended to implementations wherein a greater number of ferrules are positioned in the noted side-by-side arrangement, and suitable adjustments are made to accommodate the additional ferrule (s) based on the disclosure which follows.

Figure 5:
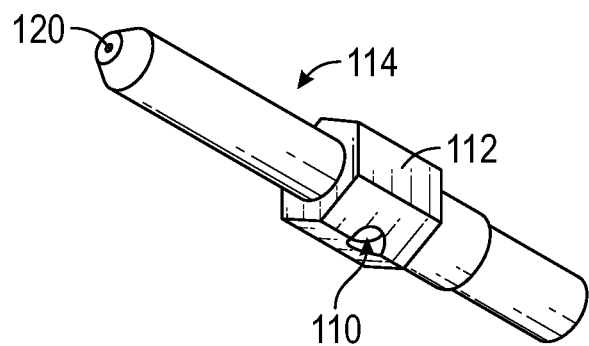
FIG. 5 is a plan view of an exemplary ferrule assembly according to an exemplary embodiment of the present invention.
Figure 6:
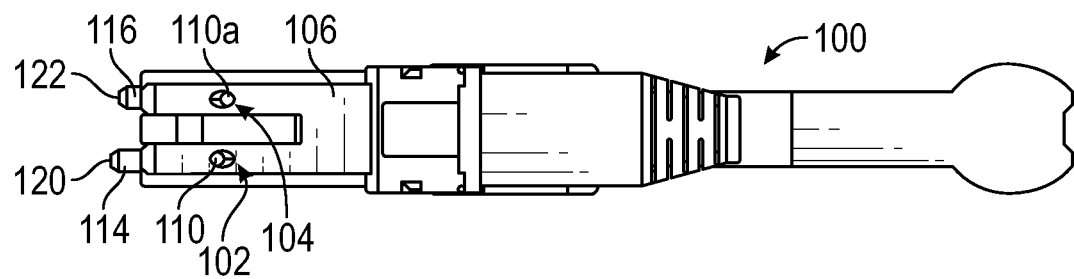
FIG. 6 is a side view of an exemplary connector that includes two ferrules of the type depicted in FIG. 5.

Thus, with reference to FIGS. 5-6, a connector 100 is provided with slots 102, 104 formed in connector body 106. The slots 102, 104 align with a guide hole 110 formed in a fitting 112 associated with ferrule 114 (see FIG. 5). Thus, as can be seen in the top view of FIG. 6, the holes 110, 110a associated with ferrules 114, 116 are longitudinally staggered in the position depicted in FIG. 6, which corresponds to the distally advanced position of ferrule 114 relative to ferrule 116. In such position, the end faces 120, 122 of ferrules 114, 116 are coplanar at an angle relative to the longitudinal axis of connector 100, e.g., 8°.

The angular orientation of end faces 120, 122 as depicted in FIG. 6 is established according to the exemplary embodiment of FIGS. 5 and 6 by interaction of a pin-like element associated with the polishing fixture which, in this instance, has operated on ferrule 116 by engaging hole 110a through slot 104 and drawing ferrule 116 proximally by the distance permitted by slot 104. In this way, the desired coplanar arrangement of end faces 120, 122 (e.g., at an 8° angle relative to the longitudinal axis of connector 100) is established for polishing purposes but, at the conclusion of the polishing operation, ferrule 116 may be advanced relative to the connector body 102, e.g., by operation of the pin-like structure associated with the polishing fixture interacting with hole 110a through slot 104 to advance ferrule 116 to a desired distal/mating position. Thus, after polishing, the end faces 120, 122 may assume a mating position with the angle polished end faces in a lateral orientation.

In exemplary embodiments of the connector 100, one or both ferrules 114, 116 may be spring biased in a distal direction, e.g., by compression springs positioned within connector body 102, and the proximal movement of ferrule 116 based on sliding motion initiated by interaction with the pin-like structure associated with the polishing fixture through slot 104, may be automatically reversed (after polishing) by releasing the pin-like structure from the hole 110a, and allowing the compression spring to exert a distal force to return ferrule to its distal-most position. In the distal-most position, end face 122 of ferrule 116 and end face 120 of ferrule 114 are in a lateral orientation.

An advantageous method for polishing a connector 100 according to the embodiment of FIGS. 5-6 entails positioning the connector 100 in a first position (with the end faces of the first/second ferrules in a coplanar orientation at an angle relative to the longitudinal axis of the connector, e.g., 8°) by sliding a first ferrule proximally relative to connector body 106 by engaging a guide element (e.g., a hole 110a) associated with the first ferrule through a slot 104 formed in the connector body 106 and laterally tilting the connector (e.g., to an angle of 8°) to polish the end faces 120, 122, then moving the connector (or allowing the connector to move) to a second/mating position with the angle polished end faces 120, 122 in a lateral orientation by sliding the first ferrule (or allowing the first ferrule to slide) distally to a distally extended/mating position.

Turning to FIGS. 7-10, an exemplary slide cam mechanism according to the present disclosure is schematically depicted. The slide cam mechanism is advantageously associated with a polishing fixture and interacts with a ferrule that is movably mounted relative to a connector body of the type described with reference to FIGS. 5-6. Thus, the disclosed slide cam mechanism is effective to move a ferrule proximally relative to a connector body as part of an angled polishing operation (e.g., at 8°) and, post-polishing, to cause or permit the ferrule to return to a distal/mating position.

Figure 7:
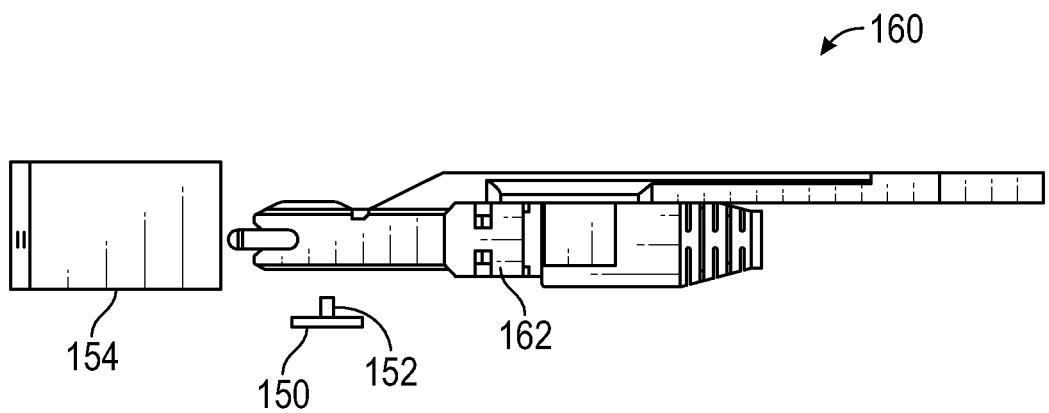
FIG. 7 is a side view of an exemplary slide cam prior to engagement with a connector according to the present disclosure.
Figure 8:
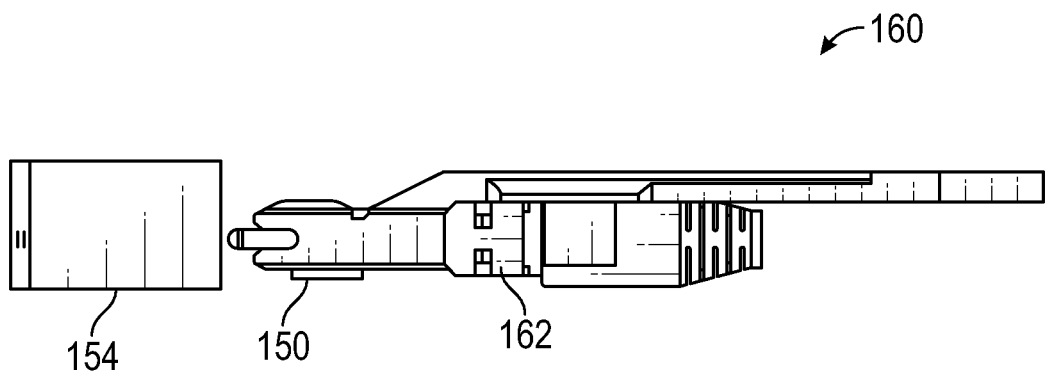
FIG. 8 is a side view of the exemplary slide cam of FIG. 7 engaged with a connector according to the present disclosure.

As shown in FIGS. 7 and 8, slide cam 150 includes a pin-like extension 152 that is configured and dimensioned to extend through a slot defined in connector body 162 of connector 160 and engage a hole/aperture defined by or in one of the ferrules. Main fixture mount 154 is schematically depicted and is adapted to support/control operation of slide cam 150. As shown in FIG. 7, slide cam 150 is initially in spaced relation relative to connector 160. Thereafter, as shown in FIG. 8, slide cam 150 engages connector with pin-like extension 152 engaging a hole/aperture associated with one of the ferrules associated with connector 160.

Figure 9:
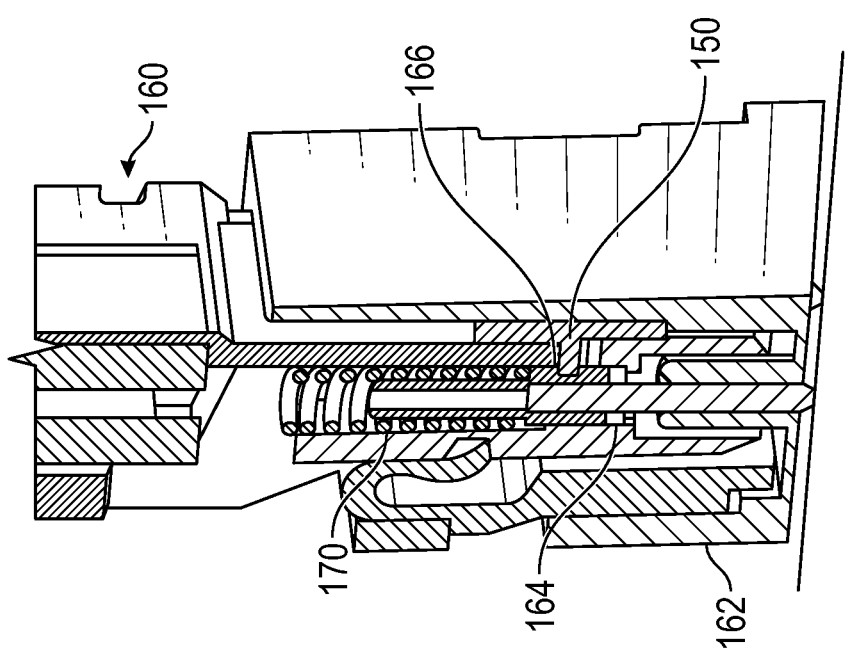
FIG. 9 is a side view, partially in section, showing the slide cam of FIGS. 7 and 8 engaged with an aperture associated with one of the ferrules of the connector.

Turning to FIG. 9, the pin-like extension 152 of slide cam 150 engages an aperture/hole 166 associated with ferrule 164 through a slot defined in connector body 162. The connector/connector body/ferrule of FIG. 9 generally define structures that correspond to the structures described with reference to FIGS. 5 and 6. Compression spring 170 is positioned within connector body 162 and biases ferrule 164 distally relative to connector body 162. The polishing fixture is adapted to permit or cause movement of slide cam 150 relative to connector 160. Thus, based on proximal movement of slide cam 150 relative to connector body 162, ferrule 164 is moved proximally against the bias of compression spring 170. The extent of travel of slide cam 150 relative to connector body 162 may be controlled in various ways, including control software. However, in the exemplary embodiment disclosed herein, the extent of proximal travel is limited by the extent of the slot formed in the connector body, as described with reference to FIG. 6.

Figure 10:
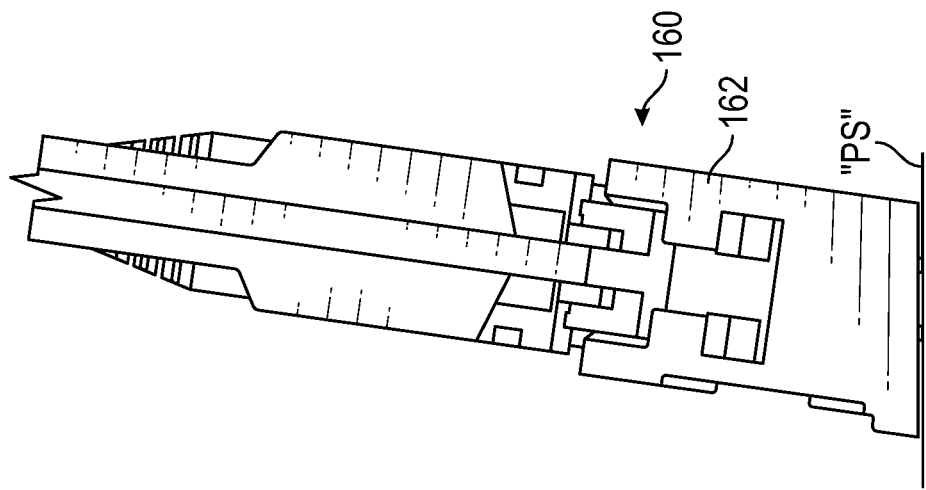
FIG. 10 is a side view showing the ferrules/end faces in a coplanar orientation at an angle relative to the longitudinal axis of the connector and in engagement with a polishing surface.

As shown in FIG. 10, proximal movement of slide cam 150 is effective to proximally position ferrule 164 relative to connector body 162 such that the end faces associated with the two side-by-side ferrules are positioned in a plane that is angularly oriented relative to the longitudinal axis of connector 160 (e.g., at 8°). In this orientation, the ferrules are simultaneously polished at the desired angle through polishing contact with polishing surface "PS". After polishing is complete, slide cam 150 may be disengaged from ferrule 164, thereby allowing compression spring 170 to exert a distally directed force that returns ferrule 164 to its distal/mating position, i.e., a distal position in which the angle polished end faces are in a lateral orientation.

Turning to a fourth example according to the present disclosure, the disclosed connector itself is completely unmodified relative to conventional connectors, but a sleeving element is associated with the polishing fixture and functions to force one ferrule in a proximal direction relative to the connector. As with the embodiment described above with reference to FIGS. 7-10 (and, by extension, FIGS. 5-6), the ferrules associated with this fourth example are substantially co-planar during angular polish operations, i.e., coplanar in a plane that is at an angle (e.g., 8°) relative to the longitudinal axis of the connector, and automatically return to "even height", i.e., a mating position, once the connector is removed from the polishing fixture.

Figure 11:
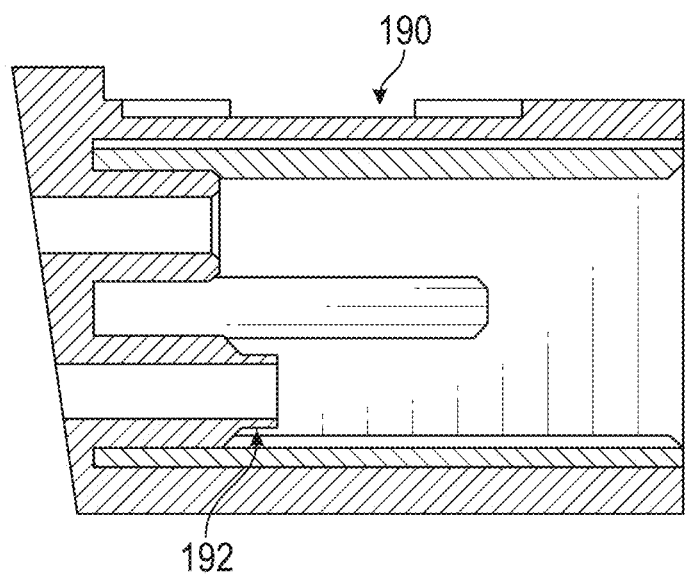
FIG. 11 is a schematic view of a sleeving element according to an exemplary embodiment of the present disclosure.
Figure 12:
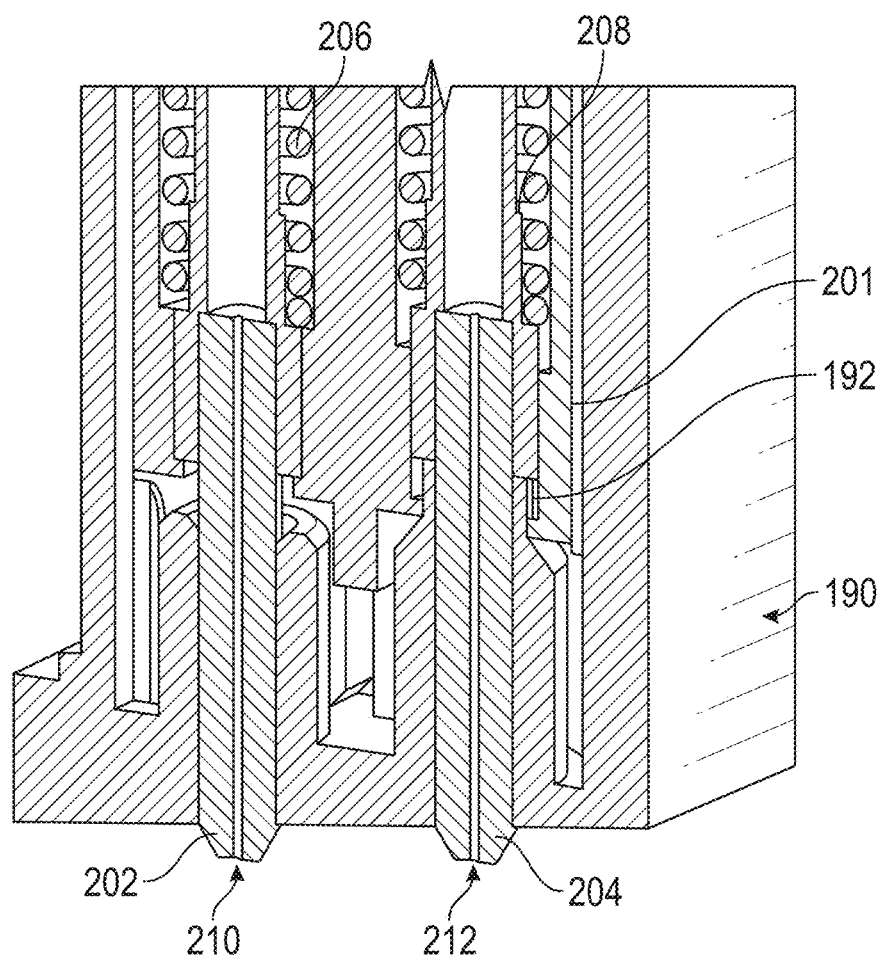
FIG. 12 is a side view, partially in section, of a conventional connector that may be employed with the sleeving element of FIG. 11.
Figure 13:
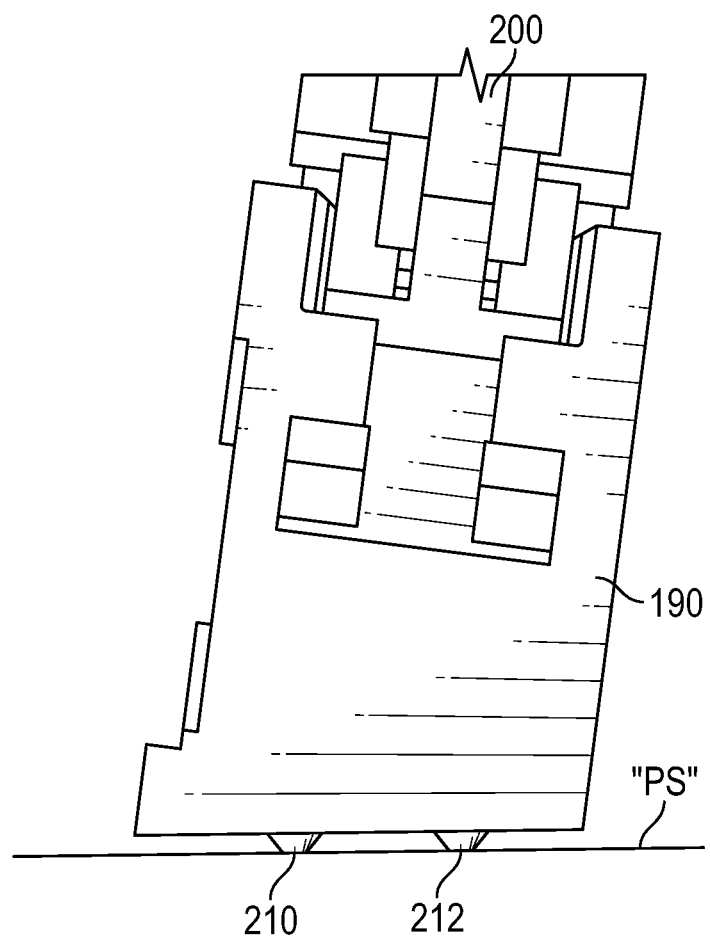
FIG. 13 is a side view of the sleeving element of FIG. 11 mounted with respect to the connector of FIG. 12.

According to this further exemplary embodiment of the present disclosure, sleeving element 190 is schematically depicted in FIG. 11 and includes an internal offset feature 192 that is adapted to engage one of the ferrules associated with a connector. Thus, as shown in the sectional view of FIG. 12, a conventional connector 200 is shown with side-by-side ferrules 202, 204 and compression springs 206, 208 mounted within connector body 201 that impart a distal bias thereto. As shown in FIG. 12, the sleeving element 190 engages the connector 200 and the offset feature 192 engages ferrule 204 to move it proximally against the bias of compression spring 208. Thus, as shown in FIG. 13, the end faces 210, 212 of ferrules 202, 204 are in a coplanar orientation that defines a plane angled relative to the longitudinal axis of connector 200 (e.g., 8°) and, in such orientation, engage the polishing surface "PS". The angle at which the end faces 210, 212 are oriented is determined by the length of offset feature within sleeving element 190. Once the angular polishing of end faces 210, 212 is complete, sleeving element 190 may be removed from connector 190 and compression spring 208 imparts a distal force on ferrule 208 that returns it to a mating position wherein angle polished end faces 210, 212 are in a lateral orientation.

In the examples disclosed herein where the polishing fixture is modified, further features may be added to introduce adjustability to the residual vertical offset height, which in turn would enable the technician to further refine the polishing setup so as to ensure as even a polishing condition as possible between ferrule positions.

Figure 14:
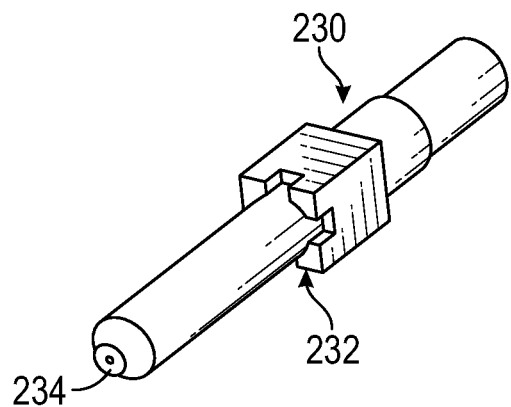
FIG. 14 is a plan view of an exemplary ferrule according to the present disclosure.
Figure 15:
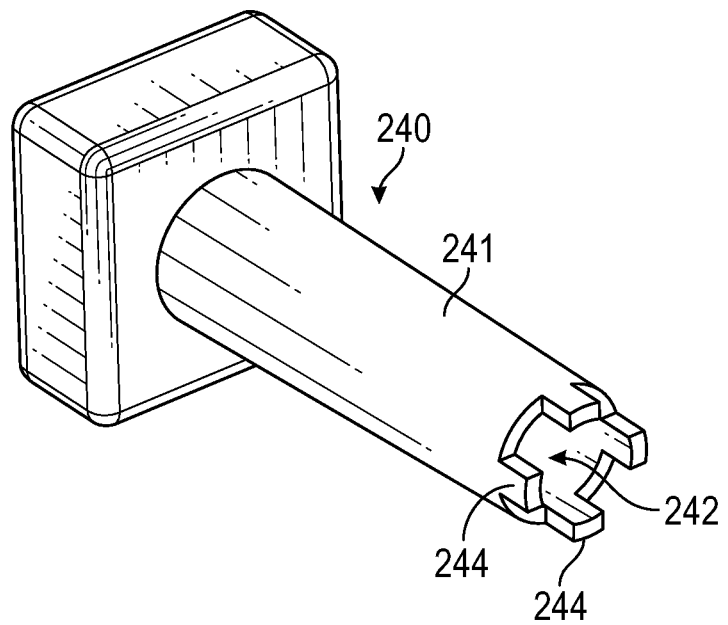
FIG. 15 is a plan view of a tool for use with the ferrule of FIG. 14.

Turning to a fifth example according to the present disclosure, ferrule(s) associated with the disclosed connector is/are modified to enable rotation of 90° relative to the connector body after polishing. In an exemplary embodiment, and as schematically depicted in FIGS. 14 and 15, ferrule 230 is provided with a notched fitting 232 that is mounted/positioned therearound (FIG. 1514), and a cooperating tool 240—that may advantageously also function as a dust cap—is provided that includes an elongated cylindrical extension 241 defining a hollow central channel 242 and distally extending teeth 244 that are configured/dimensioned to engage/cooperate with the notches formed on the notched fitting 232. Thus, in use, tool 240 may be advanced relative to ferrule 230 by positioning the end face 234 within the central channel 242 and advancing the tool 240 toward the notched fitting 232. Once contact is made between the tool 240 and the notched fitting 232, the tool may be rotated in either direction until the teeth 244 of the tool engage the notches of the notched fitting 232. Upon engagement, the tool 244 may be further rotated, e.g., by 90°, to effectuate rotation of the ferrule 230 relative to the connector in which it is mounted. In this way, the angle polished end faces may be arranged in a lateral orientation when in the mating position.

Turning to FIGS. 15, a schematic side view of a connector 270 with distally extending ferrules 272 (only one visible) in a side-by-side orientation and in polishing contact with a polishing surface "PS". The connector 270 is at an angle relative to polishing surface "PS", e.g., 8°, and the polishing operation yields angled surfaces on the end faces of the ferrules 272 that are ineffectual for the desired connector application.

Figure 17:
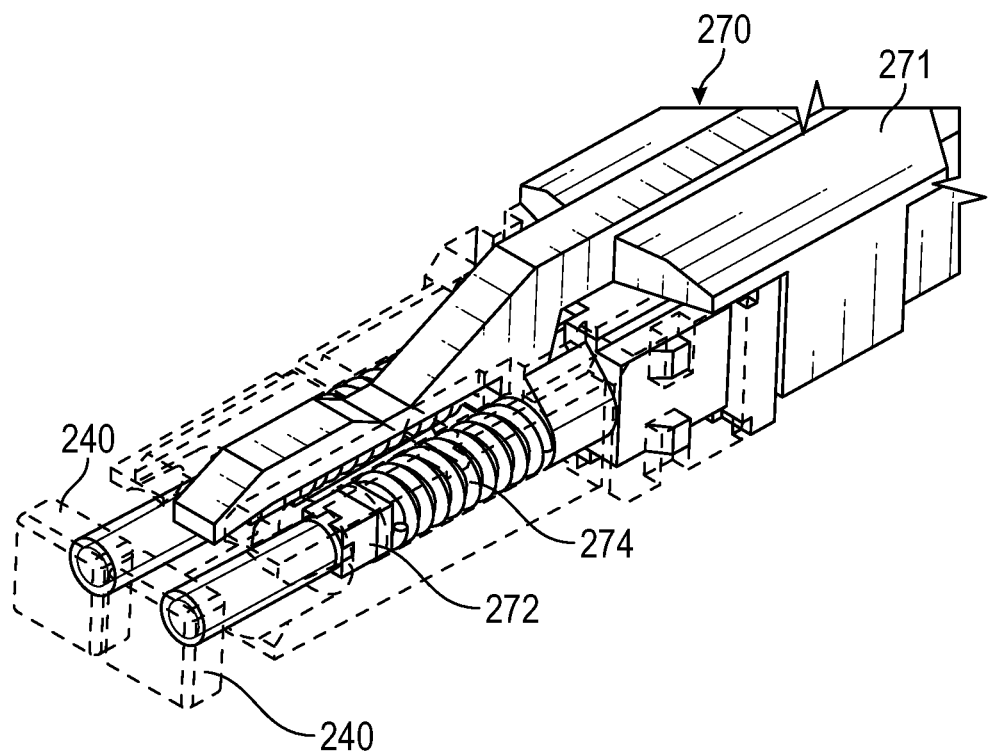
FIGS. 17-20 illustrate the steps by which the ferrules of a connector may be rotated into a mating position postpolishing according to the present disclosure.

As shown in FIGS. 17-20, two tools 240 of FIG. 15 may be positioned around side-by side ferrules 272, such that the teeth of the tools engage the cooperating notched fitting of the ferrules. Thus, as shown in FIG. 17, "Step 1" of the rotation procedure involves installing the tool/dust cap onto a ferrule end of a plug connector.

Figure 18:
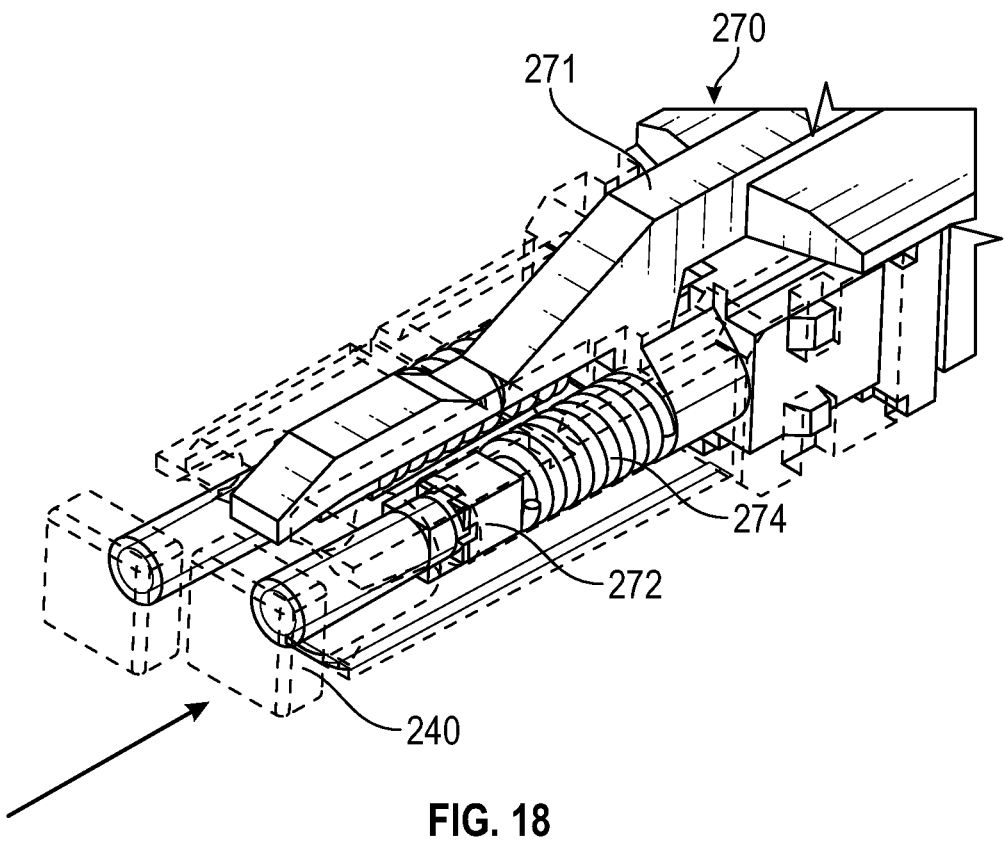

With reference to FIG. 18, the tool 240 that is being used to rotate a ferrule 272, in this case the right-hand tool, is pushed inward against the bias of spring 274 to free up the ferrule for 90° rotation within the connector body 271 of connector 270 pursuant to "Step 2" of the rotation procedure. By "freeing up" is meant that the internal structure of connector body 271 includes a region that permits free rotation of notched fitting 232 therewithin and such region is proximal of the rest position of ferrule 272. As a result, it is necessary to move the ferrule 272 proximally, against the bias of spring 274, to permit free rotation of ferrule 272 as described herein.

Figure 19:
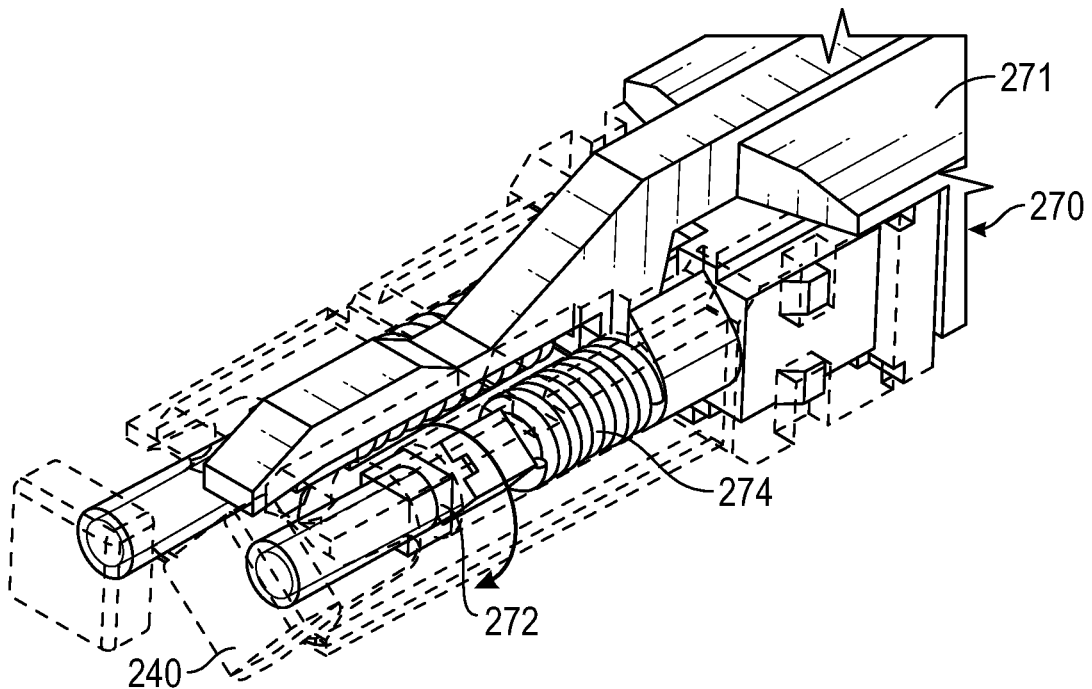

Turning to FIG. 19, the tool 240 is used to rotate the ferrule 272 by 90° relative to connector body 271.

Figure 20:
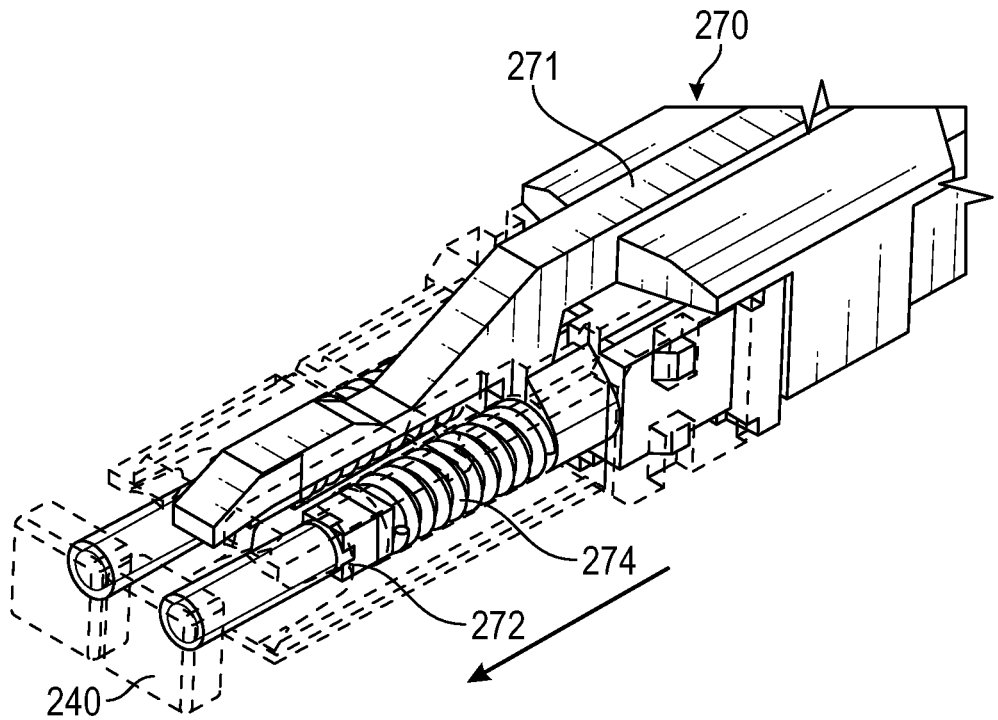
Figure 21:
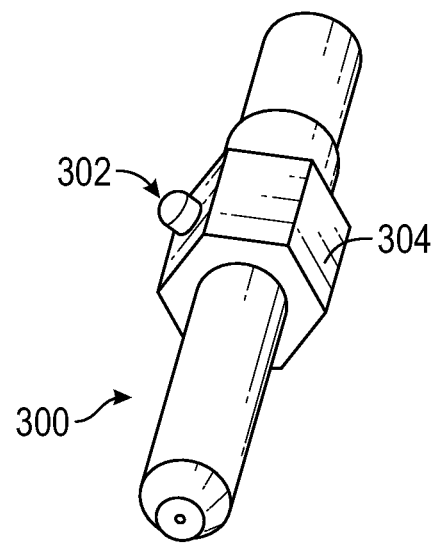
FIG. 21 is a plan view of an alternative ferrule according to the present disclosure.

As shown in FIG. 20, once the ferrule has been rotated 90°, proximal pressure against tool 240 may be released and the spring 274 within connector body 271 exerts a distal force that returns the ferrule to its initial/mating position wherein the rotated, angle polished end face is in a lateral orientation. Once both ferrules are rotated by 90°, the angle polished end faces of the ferrules are oriented in a desired manner relative to each other for purposes of end use, i.e., a vertical polish orientation is converted into a lateral polish orientation at a post-polishing stage.

With reference to FIGS. 21-26, a further exemplary embodiment according to the present disclosure is schematically depicted. In this further example, a set of cam features are added to the interior of the connector housing, which contains two keyways for each ferrule, located 90° apart. Thus, with particular reference to FIG. 21, ferrule 300 includes a cam extension 302 that extends from a fitting 304 associated with the ferrule.

Figure 22:
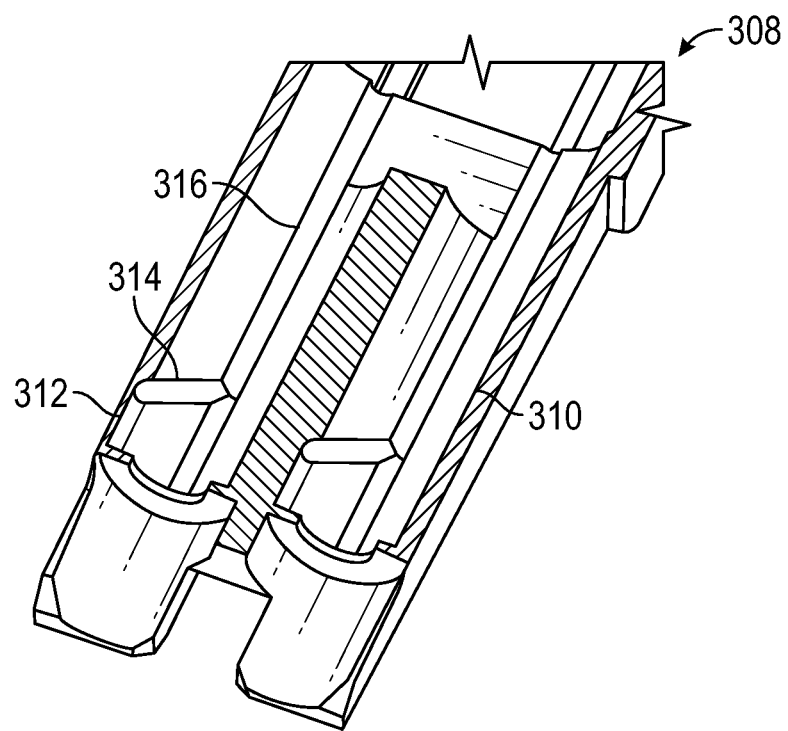
FIG. 22 is top view, partially in section, of an interior of a connector body according an embodiment of the present disclosure.

Turning to FIG. 22, the interior of a connector body 310 associated with connector 308 is shown, partially in section. Connector body 310 defines an initial channel 312 that is relatively short, a transfer channel 314 that is angled, and a main channel 316 that is full length for purposes of the ferrule to be inserted therein. Each of the foregoing channel features is depicted in duplicate (side-by-side) to accommodate positioning of side-by-side ferrules therewithin.

Figure 16:
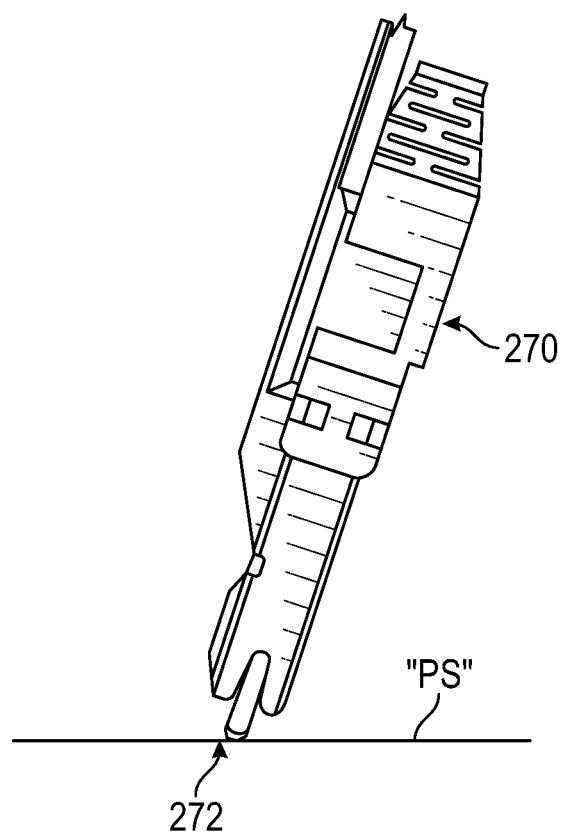
FIG. 16 is a side view of connector being polished according to the present disclosure.
Figure 23:
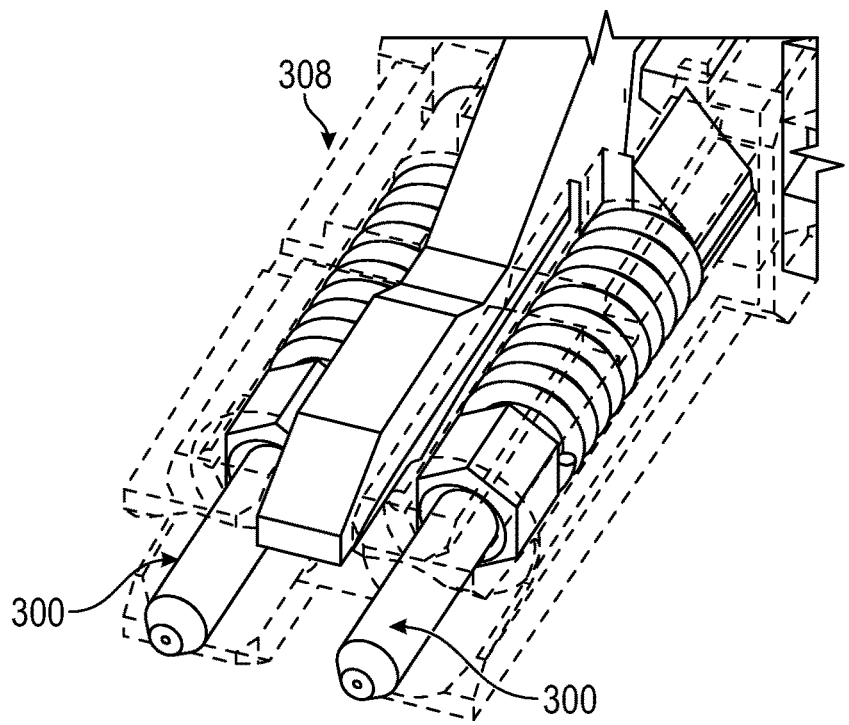
FIG. 23 is a plan view, partially in section, showing a connector with side-by-side ferrules arranged for polishing.
Figure 24:
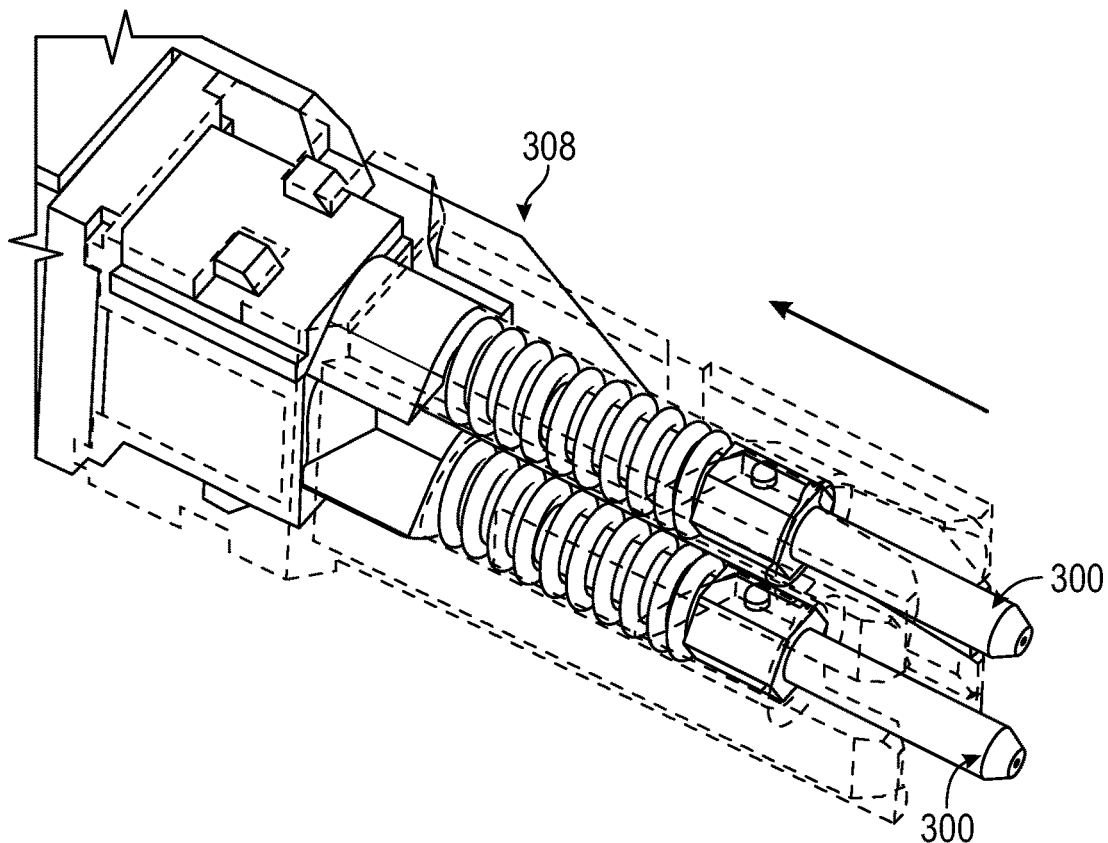
FIGS. 24-26 illustrate the steps by which the ferrules of a connector may be rotated by 90° into a mating position post-polishing according to the present disclosure.
Figure 25:
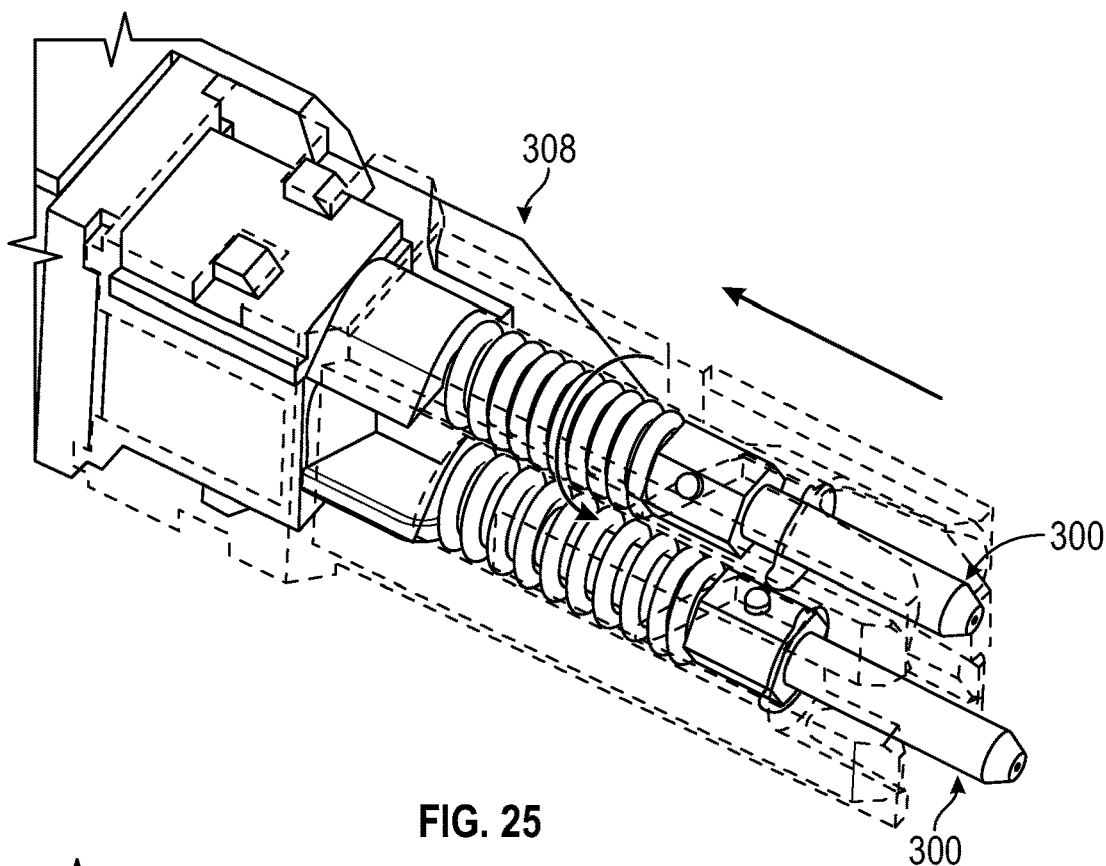
Figure 26:
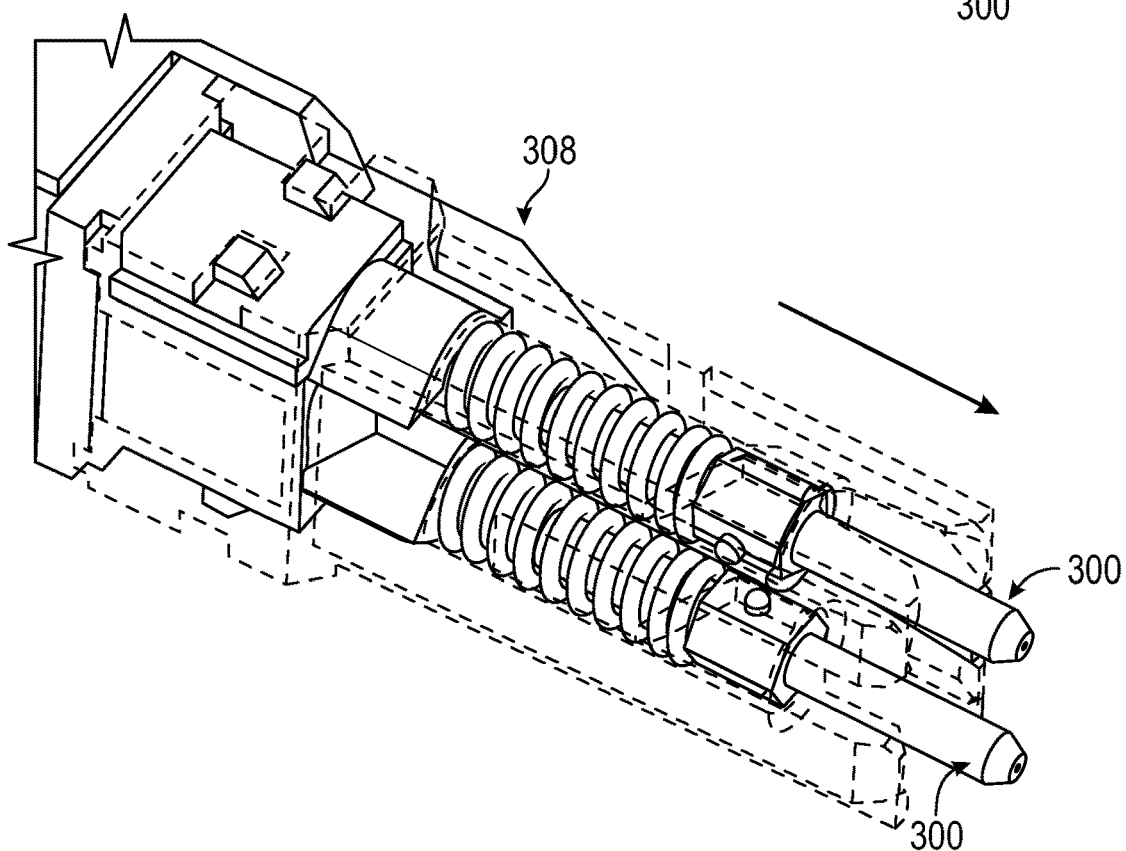

In use, the connector 308 would be initially assembled with the ferrules 300 keyed into the initial channel 312. The ferrules 300 would then be polished in the same manner as the prior example (see FIG. 16) and as depicted in FIG. 23. As described therein, both side-by-side ferrules 300 are polished in plane with vertical angle orientation, and 90° rotation is needed to convert to lateral orientation relative to the connector body.

Once polished, each ferrule 300 is pushed in against the bias of the compression spring positioned within the connector body. As the ferrule 300 travels proximally, the cam extension 302 engages the transfer channel 314 defined within ferrule body 310 and is forced to rotate 90° along the helical transfer channel 314 which merges to the main channel 316 at the bottom of each ferrule passage (see FIGS. 24 and 25). Once the cam extension 302 has reached the main channel 316, the ferrule 300 will have completed the desired 90° rotation, and the ferrule 300 may be released so that it can return to its initial mating position under the bias of the compression spring (see FIG. 26). Thus, through the camming operation within connector body 310, the initial vertical polish orientation is converted into a lateral polish orientation. By undertaking the noted operation with respect to both ferrules, the side-by-side end faces are in a lateral orientation when in the mating position.

Of note, the rotation mechanism described with reference to FIGS. 21-26 does not require a special tool to effectuate the rotation (as required for the rotation mechanism of FIGS. 14-20). However, in the case of the rotation mechanism of FIGS. 21-26, the 90° rotation would be essentially permanent and irreversible, whereas the rotation mechanism of FIGS. 14-20 could be turned either way and at any time by means of the keyed tool.

Though the specific embodiments differ substantially, all share a common working principle—the angled ferrule surfaces are substantially co-planar during the polishing process, and subsequently released to a different position for mating purposes, in which the angled surfaces are substantially offset from one another and in a lateral orientation. This enables gang-polishing of fully assembled connectors, without the risk of over-polishing and/or under-polishing one or both ferrule positions. As can be seen from the examples furnished above, the implementation of this working principle may vary, but in all cases substantial engineering attention must be paid to the design modifications which are to be made to the connector assembly, the polishing fixture, or both.

The invention claimed is:

1. A device for angle polishing of ferrules, the device comprising:
   a sleeving element including an interior configured to receive at least two ferrules of a connector, the at least two ferrules including a first ferrule and a second ferrule; and
   an offset feature disposed within the interior of the sleeving element, the offset feature configured to engage the first ferrule or the second ferrule to move the first or second ferrule against a bias of a spring associated with the first or second ferrule;
   wherein engagement of the first ferrule or the second ferrule with the offset feature results in a coplanar orientation of end faces of the first and second ferrules along a plane angled relative to a longitudinal axis of the connector.

2. The device of claim 1, wherein the first ferrule and the second ferrule are disposed in a side-by-side orientation and movable relative to a connector body of the connector.

3. The device of claim 1, wherein the sleeving element includes a first side and a second side, and the sleeving element is configured to receive the first ferrule and the second ferrule from the first side and within the interior such that the first and second ferrules extend from the second side of the sleeving element.

4. The device of claim 1, wherein in the coplanar orientation, the end faces of the first and second ferrules are offset from each other relative to a connector body of the connector.

5. The device of claim 1, wherein the coplanar orientation of the end faces of the first and second ferrules is a polishing position of the end faces.

6. The device of claim 1, wherein the plane is angled by 8 degrees relative to the longitudinal axis of the connector in the coplanar orientation.

7. A system for angle polishing, comprising:
   a connector including at least two ferrules, the at least two ferrules including a first ferrule and a second ferrule, and wherein the connector includes a first spring biasing the first ferrule, and a second spring biasing the second ferrule; and
   a sleeving element including an interior configured to receive the at least two ferrules of the connector, the sleeving element including an offset feature disposed within the interior of the sleeving element, the offset feature configured to engage the first ferrule or the second ferrule to move the first or second ferrule against a bias of the respective first or second spring;
   wherein engagement of the first ferrule or the second ferrule with the offset feature results in a coplanar orientation of end faces of the first and second ferrules along a plane angled relative to a longitudinal axis of the connector.

8. The system of claim 7, wherein the first and second ferrules are configured to move relative to a connector body of the connector.

9. The system of claim 7, wherein removal of the sleeving element from the connector disengages the first ferrule or the second ferrule.

10. The system of claim 9, wherein disengagement of the first ferrule or the second ferrule allows the first and second springs to bias the respective first and second ferrules distally into a lateral orientation.

11. The system of claim 10, wherein the lateral orientation defines a mating position in which the end faces of the first and second ferrules are aligned along a plane perpendicular to the longitudinal axis of the connector.

12. The system of claim 7, wherein the plane is angled by 8 degrees relative to the longitudinal axis of the connector in the coplanar orientation.

13. A method of angle polishing ferrules, the method comprising:
   positioning at least two ferrules of a connector within an interior of a sleeving element, the sleeving element including an offset feature disposed within the interior of the sleeving element, and the at least two ferrules including a first ferrule and a second ferrule; and
   engaging the first ferrule or the second ferrule with the offset feature of the sleeving element to move the first or second ferrule against a bias of a spring associated with the first or second ferrule, wherein engagement of the first ferrule or the second ferrule with the offset feature results in a coplanar orientation of end faces of the first and second ferrules along a plane angled relative to a longitudinal axis of the connector.

14. The method of claim 13, wherein the sleeving element includes a first side and a second side.

15. The method of claim 14, wherein positioning the first and second ferrules within the interior of the sleeving element comprises inserting the first and second ferrules into the interior of the sleeving element from the first side such that the first and second ferrules extend from the second side of the sleeving element.

16. The method of claim 15, comprising polishing the end faces of the first and second ferrules extending from the second side of the sleeving element.

17. The method of claim 13, comprising removing the first and second ferrules from the sleeving element to disengage the offset feature from the first ferrule or the second ferrule.

18. The method of claim 17, wherein disengagement of the first ferrule or the second ferrule allows the first and second springs to be biased distally by springs of the connector into a lateral orientation.

19. The method of claim 18, wherein the lateral orientation defines a mating position in which the end faces of the first and second ferrules are aligned along a plane perpendicular to the longitudinal axis of the connector.

20. The method of claim 13, wherein the plane is angled by 8 degrees relative to the longitudinal axis of the connector in the coplanar orientation.

* * * * *